(12) United States Patent
Park et al.

(10) Patent No.: US 11,691,900 B2
(45) Date of Patent: Jul. 4, 2023

(54) TRAP APPARATUS OF CONDENSATE WATER

(71) Applicant: KYUNGDONG NAVIEN CO., LTD., Gyeonggi-do (KR)

(72) Inventors: Jun Kyu Park, Seoul (KR); Sung Cheul Cho, Seoul (KR); Sung Jun Ahn, Seoul (KR)

(73) Assignee: Kyungdong Navien Co., Ltd., Gyeonggi-do (KR)

( * ) Notice: Subject to any disclaimer, the term of this patent is extended or adjusted under 35 U.S.C. 154(b) by 125 days.

(21) Appl. No.: 16/759,107

(22) PCT Filed: Nov. 2, 2018

(86) PCT No.: PCT/KR2018/013284
§ 371 (c)(1),
(2) Date: Apr. 24, 2020

(87) PCT Pub. No.: WO2019/088777
PCT Pub. Date: May 9, 2019

(65) Prior Publication Data
US 2020/0346955 A1    Nov. 5, 2020

(30) Foreign Application Priority Data

Nov. 2, 2017 (KR) .................. 10-2017-0145579
Nov. 2, 2018 (KR) .................. 10-2018-0133874

(51) Int. Cl.
*C02F 1/66* (2023.01)
*F24H 9/16* (2022.01)
*C02F 103/18* (2006.01)

(52) U.S. Cl.
CPC .............. *C02F 1/66* (2013.01); *F24H 9/16* (2013.01); *C02F 2103/18* (2013.01); *C02F 2209/40* (2013.01); *C02F 2209/42* (2013.01)

(58) Field of Classification Search
CPC ........................................ C02F 1/66
See application file for complete search history.

(56) References Cited

U.S. PATENT DOCUMENTS 4,627,460 A   12/1986 Eising
4,856,550 A    8/1989 Smelcer
(Continued)

FOREIGN PATENT DOCUMENTS

CN        1361842 A    7/2002
CN      201909450 U    7/2011
(Continued)

*Primary Examiner* — Peter Keyworth (57) ABSTRACT

A trap apparatus of condensate water according to the present invention comprises: a neutralizing part including an inlet through which condensate water is introduced, an internal space for containing a neutralizing agent for neutralizing the introduced condensate water, and a condensate water passage through which the condensate water that was neutralized by the neutralizing agent in the internal space is discharged; a discharge part including a storage space for storing the condensate water which is directly or indirectly introduced through the condensate water passage, an outlet which is open in a circular shape so as to discharge the stored condensate water, and a spherical ball capable of closing the outlet by being seated on the outlet, wherein the ball is spaced from the outlet by buoyancy of the condensate water when the condensate water is contained in the storage space above a critical water level, such that the condensate water can be discharged through the outlet, and the condensate water can be neutralized simultaneously with discharging of only the condensate water without exhaust gas.

10 Claims, 6 Drawing Sheets

(56) References Cited

U.S. PATENT DOCUMENTS

| | | | |
|---|---|---|---|
| 5,115,798 A | 5/1992 | Moore, Jr. et al. | |
| 6,684,415 B1 | 2/2004 | Kozono | |
| 8,931,438 B2 | 1/2015 | Walters et al. | |
| 2012/0240869 A1 | 9/2012 | Walters et al. | |
| 2013/0118608 A1 | 5/2013 | Holiday et al. | |
| 2015/0196859 A1* | 7/2015 | Levitt | B01D 29/6476 |
| | | | 210/435 |

FOREIGN PATENT DOCUMENTS

| | | | | |
|---|---|---|---|---|
| CN | 202452693 U | | 9/2012 | |
| CN | 203413832 U | | 1/2014 | |
| EP | 503544 B1 | | 9/1982 | |
| EP | 2110364 A2 | | 10/2009 | |
| EP | 2853840 A1 | | 4/2015 | |
| JP | 2009-034588 A | | 2/2019 | |
| KR | 20-0176948 Y1 | | 4/2000 | |
| KR | 20-2010-0005324 U | * | 5/2011 | F24H 9/16 |
| KR | 20-2010-0005324 U | | 5/2011 | |
| KR | 0-2011-0068286 A | | 6/2011 | |
| KR | 10-2011-0137119 A | | 12/2011 | |
| KR | 10-2013-0117042 A | | 10/2013 | |

\* cited by examiner

TRAP APPARATUS OF CONDENSATE WATER

TECHNICAL FIELD

The present disclosure relates to a condensation water trap device used in a boiler.

BACKGROUND ART

A boiler, which serves as a heat source, exchanges heat with heating water by heating air, so as to heat the heating water of the boiler. As a temperature is lowered, exhaust gas, which is a by-product, is condensed to be phase-changed to the form of condensation water.

In general, such condensation water has acidity due to the ingredient of exhaust gas. Accordingly, when the condensation water is kept inside the boiler, the corrosion of the boiler may be accelerated. Accordingly, the condensation water needs to be properly discharged. When acidic waste water is discharged without any treatment for the waste water, severe environment pollution may be caused. Accordingly, the condensation water is allowed to pass through a neutralizing device containing a neutralizing agent, such that the neutralized waste water is discharged to the outside.

Meanwhile, while the condensation water is discharged in such a manner, the exhaust gas remaining in a gas phase without being condensed may be discharged together with the condensation water. However, it is difficult to neutralize the exhaust gas, and the exhaust gas is discharged while being diffused into the air, which is different from the waste water. Accordingly, more severe environment pollution may be caused.

Accordingly, various trap devices have been used in a boiler field to discharge the condensation water while preventing the exhaust gas from being discharged.

Meanwhile, the neutralizing device and the trap device are separately provided, which mainly causes the increase in the size of the boiler.

Technical Problem

The present disclosure is suggested to solve the above problem, and provides a trap device embedded therein with a neutralizing device, capable of discharging only condensation water while preventing discharging exhaust gas.

Technical Solution

According to an embodiment of the present disclosure, a condensation water trap device includes a neutralizing unit including an inlet to introduce condensation water, an inner space to receive a neutralization agent for neutralizing the introduced condensation water, and a condensation water passage to allow condensation water, which is neutralized in the inner space by the neutralization agent, to flow out, and a discharging unit including a storage space to store the condensation water directly or indirectly introduced through the condensation water passage, an outlet open in a circular shape such that the stored condensation water is discharged, and a ball having a spherical shape and seated on the outlet to close the outlet. The ball is spaced apart from the outlet through buoyancy applied by the condensation water when the condensation water is received at a threshold water level or more in the storage space, such that the condensation water is discharged through the outlet

Advantageous Effects

Accordingly, while the condensation water is neutralized, the trap is operated to block the exhaust gas and to discharge only the condensation water.

In addition, the neutralizing device is integrally provided with the trap, thereby reducing the space occupied by the boiler.

Further, the space containing the neutralizing agent serves as the additional trap to prevent the ball-type trap from being unstably operated due to exhaust pressure and to form the trap structure which dually blocks the exhaust gas from being discharged.

The specific structure, in which the packing having elasticity makes contact with the ball, is formed, thereby minimizing the deterioration in the performance of airtightness between the ball and the packing, which occurs as foreign matters are piled.

The foreign matter removing unit is interposed between the ball-type trap and the neutralizing unit, thereby reducing an amount of foreign matters contained in the condensation water to be discharged to the outlet.

The anti-deviation wall to surround the ball is formed to prevent a situation in which the ball deviates from the ball trap to fail the function of the trap.

MODE FOR INVENTION

Hereinafter, some embodiments of the present disclosure will be described in detail with reference to the exemplary drawings. In assigning the reference numerals to the components of each drawing, it should be noted that the identical or equivalent component is designated by the identical numeral even when they are displayed on other drawings. Further, in the following description of the embodiment of the present disclosure, a detailed description of well-known features or functions will be ruled out in order not to unnecessarily obscure the gist of the present disclosure In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. When a certain component is "liked to", "coupled to", or "connected with" another component, the certain component may be directly linked to or connected with the another component, and a third component may be "linked", "coupled", or "connected" between the certain component and the another component.

Figure 1:
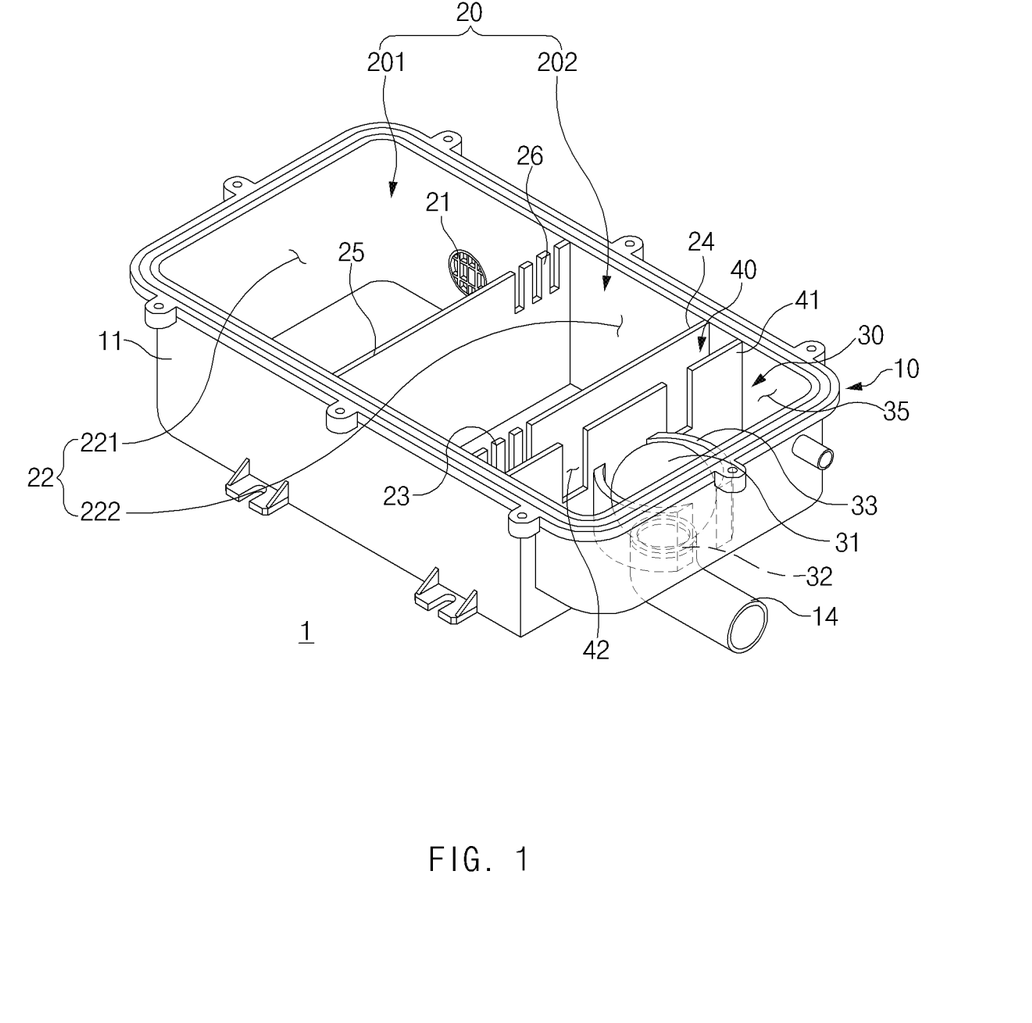
FIG. 1 is a perspective view of a condensation water trap device, according to an embodiment of the present disclosure.
Figure 2:
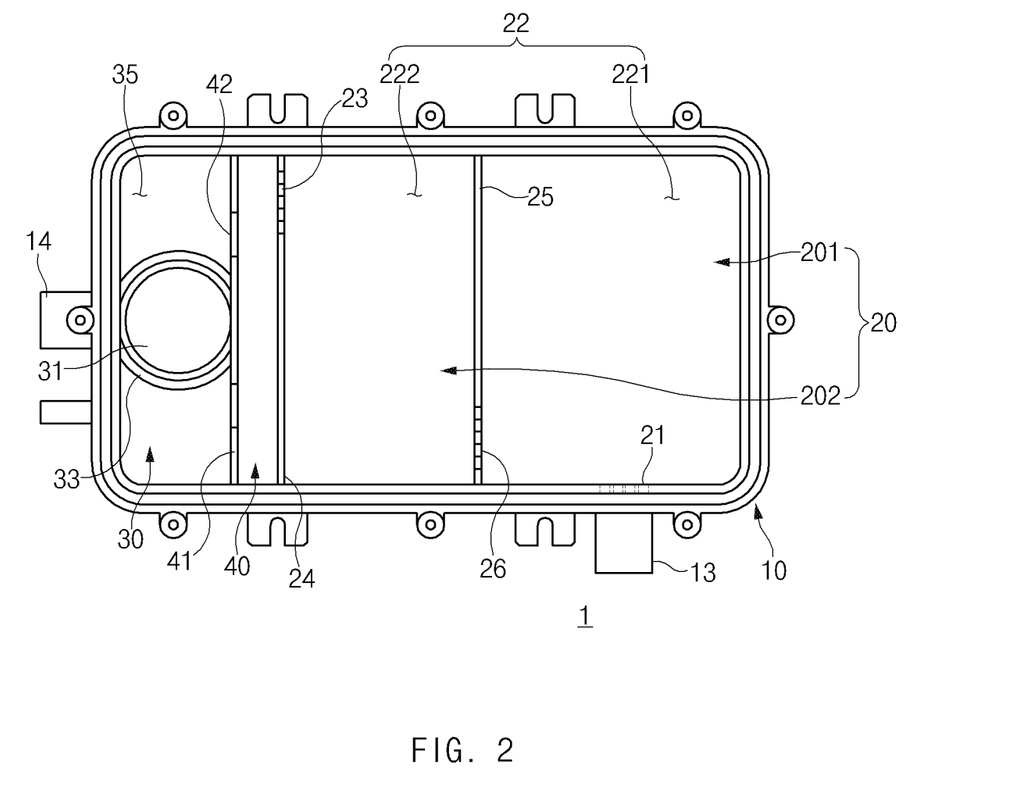
FIG. 2 is a plane view of a condensation water trap device, according to an embodiment of the present disclosure.
Figure 3:
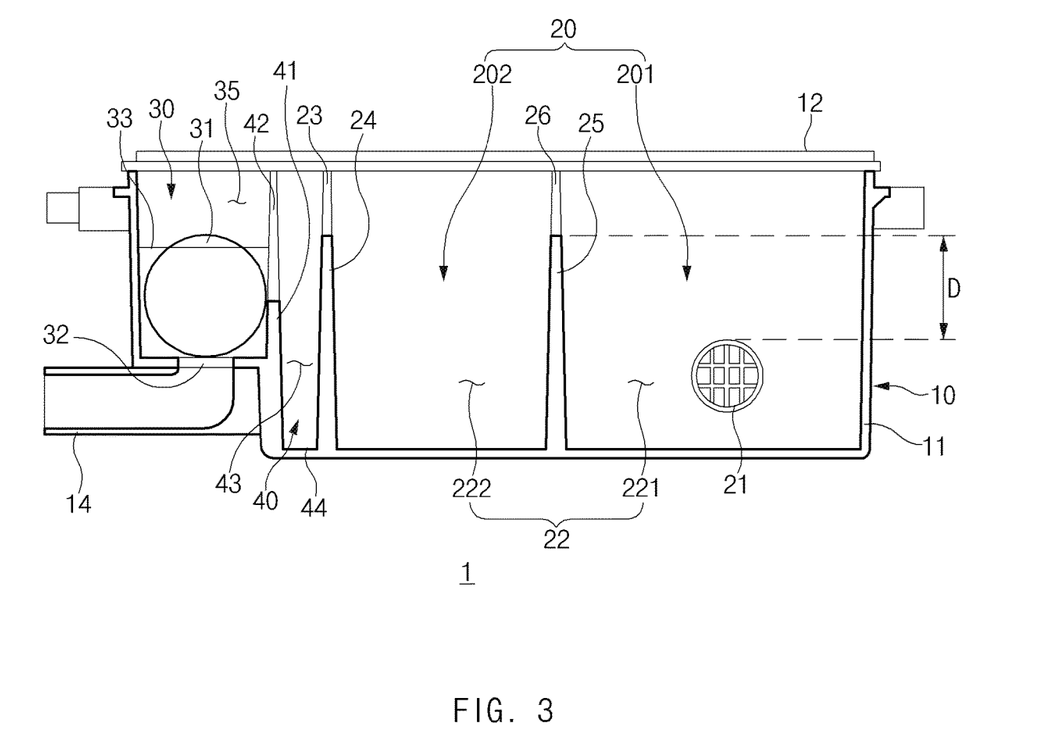
FIG. 3 is a side view of a condensation water trap device, according to an embodiment of the present disclosure.
Figure 4:
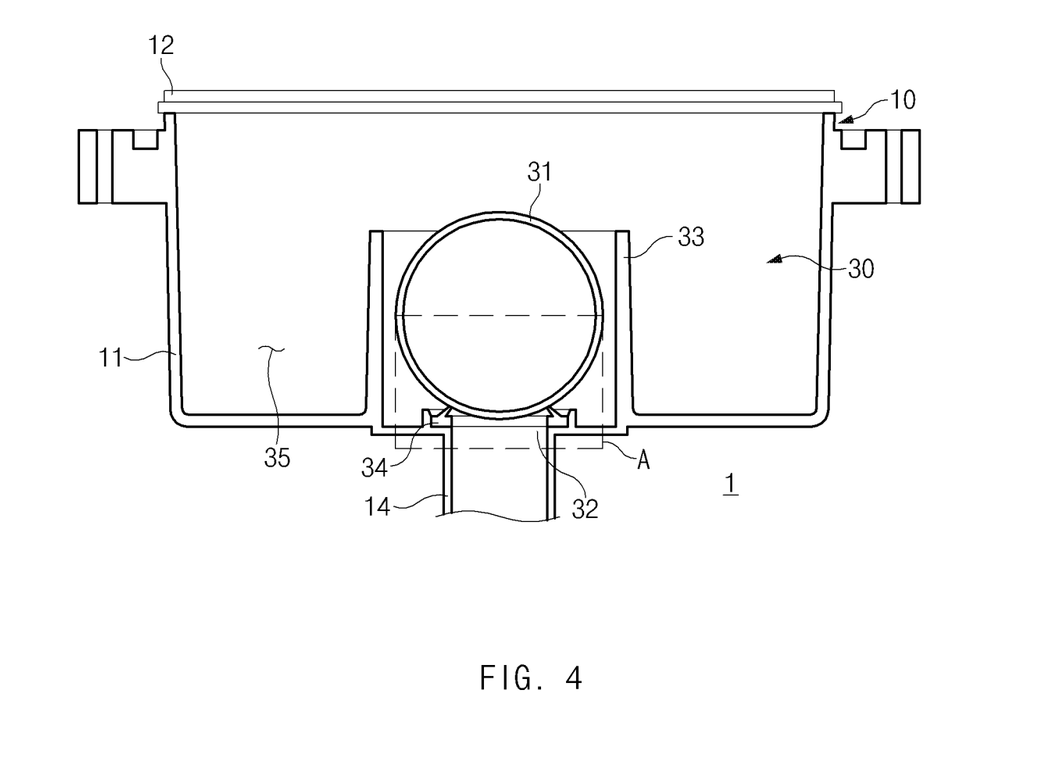
FIG. 4 is a front view of a condensation water trap device, according to an embodiment of the present disclosure.

FIG. 1 is a perspective view of a condensation water trap device 1, according to an embodiment of the present disclosure, FIG. 2 is a plane view of the condensation water trap device 1, according to an embodiment of the present disclosure, FIG. 3 is a side view of the condensation water trap device 1, according to an embodiment of the present disclosure, and FIG. 4 is a front view of the condensation water trap device 1, according to an embodiment of the present disclosure.

Referring to FIGS. 1 to 4, according to an embodiment of the present disclosure, the condensation water trap device 1 includes a neutralizing unit 20 to receive condensation water to be neutralized and a discharging unit 30 to discharge the neutralized condensation water to the outside. The neutralizing unit 20 and the discharging unit 30 may be provided together inside a case 10 which is in an integral type. The neutralizing unit 20 and the discharging unit 30 may be arranged in one direction perpendicular to a vertical direction, inside the case 10 which is in the integral type. The case 10 may include a case body 11 and a cover 12 to form a top surface of the case 10.

A conventional neutralizing device and a conventional trap device, which correspond to the neutralizing unit 20 and the discharging unit 30, have mutually different objects to neutralize discharged condensation water and to block the discharge of exhaust gas. Accordingly, the conventional neutralizing device and the conventional trap device are provided separately from each other and used for a container to store the condensation water and a discharge stage to discharge the condensation water to the outside, respectively. However, according to an embodiment of the present disclosure, in the condensation water trap device 1, the neutralizing unit 20 and the discharging unit 30 are realized in the integral-type case 10 in the form of one device, thereby saving a space in the boiler and producing an additional trap effect using the neutralized condensation water.

Although an embodiment of the present disclosure is described in that the case 10 has a three-dimensional shape such as a substantially rectangular parallelopiped, the shape of the case 10 is not limited thereto. According to an embodiment of the present disclosure, the condensation water trap device 1 has the above structure, so the introduced condensation water is neutralized and placed in a ball trap to control the discharge of the condensation water to the outside. When the condensation water is discharged from the condensation water trap device 1 according to the present disclosure, the received exhaust gas is not discharged from the condensation water trap device 1.

In the present specification, the vertical direction refers to a height direction of the case 10 illustrated in the drawing, a shorter direction of the case 10 refers to another direction except the vertical direction of a neutralizing unit partition 25 or a discharge partition 24 illustrated in the drawing, and a longer direction of the case 10 refers to a direction perpendicular to both the vertical direction and the shorter direction of the case 10.

Neutralizing Unit 20

The neutralizing unit 20, which is a container to receive condensation water produced as exhaust gas of the boiler is condensed, receives and neutralizes the condensation water, and discharges the neutralized condensation water to the discharging unit 30 to be described later. Therefore, the trap and the neutralizing device are unified due to the actions of the neutralizing unit 20 and the discharging unit 30, to save a space. To perform the operations, the neutralizing unit 20 includes an inlet 21 communicating with an introducing pipe 13 to introduce condensation water, an inner space 22 to receive the condensation water, and a condensation water passage 23 to move the neutralized condensation water to the discharging unit 30.

The inlet 21, which is an opening to introduce the condensation water, allows the introducing pipe 13 to communicate with the inner space 22 of the neutralizing unit 20. The introducing pipe 13 allows the flow of condensation water, which is formed as exhaust gas of the boiler is condensed inside, to transmit the condensation water into the inner space 22 through the inlet 21. Although an embodiment of the present disclosure is described in that the inlet 21 is formed through one sidewall of the neutralizing unit 20, the position of the inlet 21 is not limited thereto. For example, the inlet 21 may be formed through a sidewall facing another direction.

The inner space 22 is a space surrounded by a sidewall, a top surface, and a bottom surface of the neutralizing unit 20, and the condensation water is received in the inner space 22. In addition, a neutralizing agent is contained in the inner space 22 to neutralize the received condensation water. In general, condensation water produced by condensing exhaust gas has acidity. The discharge of an acidic solution has to be blocked. The acidic solution, which is stored without change, may cause the corrosion of parts. Therefore, an alkali neutralizing agent, which is able to raise the pH level by neutralizing the acidic condensation water, is received in the inner space 22 and reacts with the introduced condensation water to neutralize the condensation water. Sodium hydroxide, magnesium hydroxide, calcium hydroxide, and calcium carbonate may be used as the neutralizing agent, but the ingredient of the neutralizing agent is not limited thereto.

The condensation water passage 23, which is a passage to discharge condensation water from the inner space 22 of the neutralizing unit 20, is positioned at the boundary between the condensation water and the discharging unit 30. To place the condensation water passage 23, the discharge partition 24 may be further disposed to separate the neutralizing unit 20 from the discharging unit 30. Since the neutralizing unit 20 and the discharging unit 30 are arranged to be adjacent to each other in the direction perpendicular to the vertical direction in the case 10 of the condensation water trap device 1, the discharge partition 24 is interposed between the neutralizing unit 20 and the discharging unit 30, and the condensation water passage 23 is formed through one point of the discharge partition 24. The discharge partition 24 may be formed to extend in the vertical direction. The condensation water passage 23 allows the neutralizing unit 20 to communicate with the discharging unit 30. Therefore, the condensation water passage 23 performs a function of discharging an excess amount of condensation water provided in the neutralizing unit 20, when the condensation water is received higher than the position of the condensation water passage 23 inside the inner space 22.

The condensation water passage 23 may be placed in one point, which is higher than the position of the inlet 21 of the neutralizing unit 20, of the discharge partition 24. In other words, the distance from the bottom surface of the case 10 to the condensation water passage 23 may be greater than the distance from the bottom surface of the case 10 to the inlet 21. As recognized from FIG. 3, when the hydraulic pressure resulting from the height difference 'D' between the condensation water passage 23 and the inlet 21 occurs, and the water level of the condensate water reaches a position higher than the position of the inlet 21, the condensation water may flow to an outlet through the condensation water passage 23. Therefore, in the state that the water level of the condensation water reaches the position higher than the position of the inlet 21, there naturally occurs an action of a trap device to maintain airtightness against the exhaust gas of the condensation water trap device 1 without introducing the exhaust gas into the condensation water trap device 1 through the inlet 21.

The exhaust gas is primarily blocked from being introduced into the condensation water trap device 1 according to the present disclosure, due to the position relationship between the inlet 21 and the condensation water passage 23 of the neutralizing unit 20 or between the inlet 21 and an intermediate passage 26 to be described later. Since the inlet 21 is positioned lower than the condensation water passage 23 or the intermediate passage 26 in the vertical direction, the water level of the condensation water contained in the inner space 22 may be higher than the height of the inlet 21. Accordingly, when the water level of the condensation water received in the inner space 22 is higher than the height of the inlet 21, there occurs the hydraulic pressure resulting from the height difference between the water level of the condensation water and the inlet 21. Accordingly, the exhaust gas is neither discharged nor transmitted to the condensation water passage 23 or the intermediate passage 26.

However, a slight amount of exhaust gas may be introduced into the condensation water trap device 1 in spite of the above-described position relationship. When an exhaust port or a flue of a water heater connected with or provided therein with the condensation water trap device 1 is clogged, the pressure in the combustion chamber increases, the pressure of the exhaust gas may be higher than the hydraulic pressure. In this case, even if the condensation water closes the inlet 21, exhaust gas at higher pressure may push the condensation water to be moved into the discharging unit 30, and the condensation water may be discharged to the outside as the water level of a storage space 35 exceeds a threshold water level. The water level of the condensation water of the inner space 22 is lower than the height of the inlet 21 as the exhaust gas at the higher pressure continuously pushes the condensation water, the exhaust gas may be introduced into the condensation water trap device 1 through the inlet 21.

Nevertheless, the exhaust gas, which reaches the discharging unit 30 through the inner space 22 and the condensation water passage 23 of the neutralizing unit 20, is blocked from being discharged to the outside through the outlet 32, due to a ball-type trap structure of the discharging unit 30 to be described later. When the condensation water at a water level lower than the threshold water level is positioned in the storage space 35, a ball 31 covers the outlet 32. Accordingly, the ball 31 blocks the exhaust gas from being discharged to the outside through the outlet 32. When the water level of the condensation water stored in the storage space 35 is greater than or equal to the threshold water level, the outlet 32 is closed due to the condensation water. Accordingly, the exhaust gas is blocked from being discharged to the outside through the outlet 32 by the condensation water. Therefore, the neutralizing unit 20 and the discharging unit 30 are arranged together, thereby forming a dual trap structure to block the exhaust gas from being discharged in the condensation water trap device 1 according to an embodiment of the present disclosure.

Figure 6:
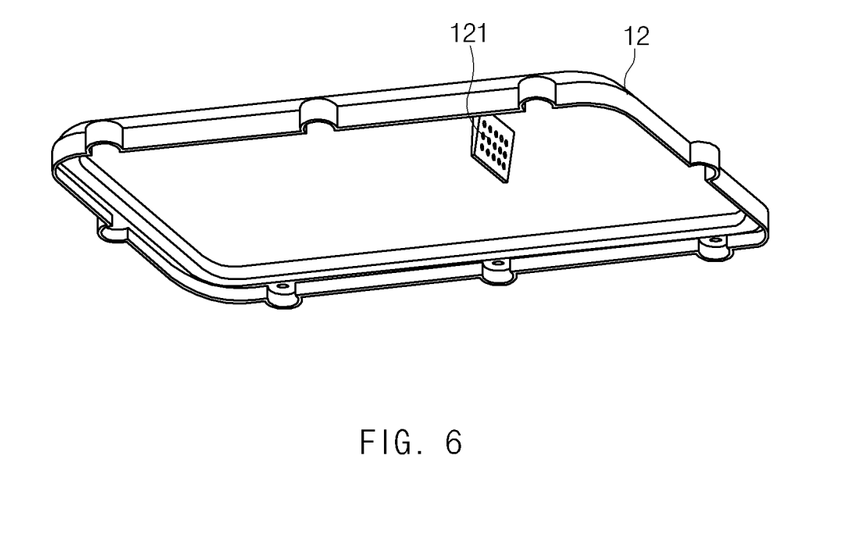
FIG. 6 is a perspective view illustrating a cover of condensation water trap device, according to an embodiment of the present disclosure.

Besides, the condensation water passage 23 is formed as a column extending in one direction and an opening are alternately arranged, thereby filtering out a foreign matter having a larger size from the condensation water. In addition, a porous mesh is provided in the condensation water passage 23, thereby filtering out a foreign matter having a smaller size from the condensation water passing through the condensation water passage 23. According to an embodiment of the present disclosure, referring to FIG. 6, which is a perspective view illustrating the cover 12 of the condensation water trap device 1, a mesh part 121, which protrudes downward, is disposed at a position, which corresponds to the condensation water passage 23, of the cover 12 forming the top surface of the case 10 of the condensation water trap device 1. When the cover 12 closes the case body 11, the mesh part 121 is covered on the condensation water passage 23 to filter the condensation water passing through the condensation water passage 23. However, a mesh structure integrated with the condensation water passage 23 may be disposed, but the mesh structure is not limited to being formed in the cover 12.

The neutralizing unit 20 may be partitioned into a plurality of spaces. The following description of an embodiment of the present disclosed will be made regarding that the neutralizing unit 20 is partitioned into a first neutralizing unit 201 and a second neutralizing unit 202 by the neutralizing unit partition 25 disposed in the inner space 22.

The neutralizing unit partition 25 may be formed to extend in the vertical direction. The neutralizing unit partition 25 separates the first neutralizing unit 201 from the second neutralizing unit 202 and includes the intermediate passage 26 to allow the first neutralizing unit 201 to communicate with the second neutralizing unit 202, such that the condensation water flows. When the water level of the condensation water stored in a first neutralizing unit inner space 221 exceeds the height of the intermediate passage 26, an excess amount of the condensation water flows into a second neutralizing unit inner space 222 through the intermediate passage 26. Accordingly, the inner space 22 is divided into the first neutralizing unit inner space 221 and the second neutralizing unit inner space 222.

As the intermediate passage 26 is positioned at one point, which is higher than the position of the inlet 21, of the neutralizing unit partition 25, the first neutralizing unit 201 may perform the function of a trap, which is similar to the condensation water passage 23. Even the intermediate passage 26 has a mesh structure similar to that of the condensation water passage 23 to filter the condensation water.

The first neutralizing unit 201 is a space having the inlet 21 to first receive the condensation water. Accordingly, the space is defined by the sidewall, the top surface, and the bottom surface of the case 10, and the neutralizing unit partition 25. The first neutralizing unit inner space 221 receives a neutralization agent to neutralize the introduced condensation water. The neutralized condensation water is transmitted to the second neutralizing unit 202 through the intermediate passage 26 positioned in the neutralizing unit partition 25.

The second neutralizing unit 202 is a space interposed between the first neutralizing unit 201 and the discharging unit 30 and defined by the sidewall, the top surface, and the bottom surface of the case 10, the neutralizing unit partition 25, and the discharge partition 24. The second neutralizing unit 202 may receive condensation water received from the first neutralizing unit 201. The second neutralizing unit inner space 222 receives a neutralization agent to neutralize the introduced condensation water again. The neutralized condensation water may be discharged to the discharging unit 30 through the condensation water passage 23 positioned in the discharge partition 24 positioned in the second neutralizing unit 202.

The intermediate passage 26 positioned in the neutralizing unit partition 25 is arranged in a zig-zag shape with respect to the condensation water passage 23, so the flow path of the condensation water passes all area of the neutralizing unit 20 as soon as possible. Referring to FIGS. 1 and 2, a straight line extending in a direction in which the condensation water passage 23 is open and a straight line extending in a direction in which the intermediate passage 26 is open are parallel to each other, and not coincident with each other. In addition, the intermediate passage 26 and the condensation water passage 23 are positioned in opposition to each other in the shorter direction of the case 10. Accordingly, when the condensation water passes through the second neutralizing unit 202, the condensation water does not directly flow from the intermediate passage 26 to the condensation water passage 23, but flows while crossing the second neutralizing unit 202. Accordingly, the neutralization agent including smaller particles and foreign matters fail to easily flow over, and the neutralization agent and the condensation water meet each other throughout the wider area.

Discharging Unit 30

The discharging unit 30, which is a component to discharge the neutralized condensation water to the outside, includes the storage space 35 to store the condensation water, the outlet 32 to discharge the condensation water to the outside, and the ball 31 which is formed in a spherical shape to close the outlet 32.

The storage space 35 is a space to directly or indirectly receive and store the neutralized condensation water from the neutralizing unit 20 through the condensation water passage 23. Accordingly, as the condensation water is received in the storage space 35, the water level of the condensation water in the storage space 35 may be gradually increased.

The outlet 32, which is an opening formed in the storage space 35, allows the storage space 35 to communicate with the outside such that the condensation water stored in the storage space 35 is discharged to the outside through the discharge pipe 14. The outlet 32, which is open in a circular shape, may be open downward in the vertical direction such that the condensation water is discharged due to the gravity.

The circular ball 31 is seated on the outlet 32 to block the condensation water from being discharged. Since the ball 31 has to be seated on the outlet 32, the ball 31 has a diameter larger than a diameter of the outlet 32. When the condensation water is received at the threshold water level or more in the storage space 35, the ball 31 floats up by receiving the buoyant of the condensation water and thus is spaced apart from the outlet 32. In this case, the condensation water is discharged to the outlet 32 through the space between the ball 31 and the outlet 32. As the condensation water is discharged to the outlet 32, the water level of the condensation water of the storage space 35 is lowered, and the buoyant applied to the ball 31 is weakened, so the ball 31 is seated on the outlet 32, thereby blocking the condensation water from being discharged. When the condensation water is discharged through the trap using the ball 31, there is absent the case that the ball 31 floats up to a position higher than the water level of the condensation water and thus spaced apart from the outlet 32. The exhaust gas present in the condensation water trap is not discharged through the outlet 32.

The neutralizing unit 20 having the above-described neutralization agent serves as a trap to prevent a ball-type trap formed by the ball 31 from being unstably acted.

Figure 5:
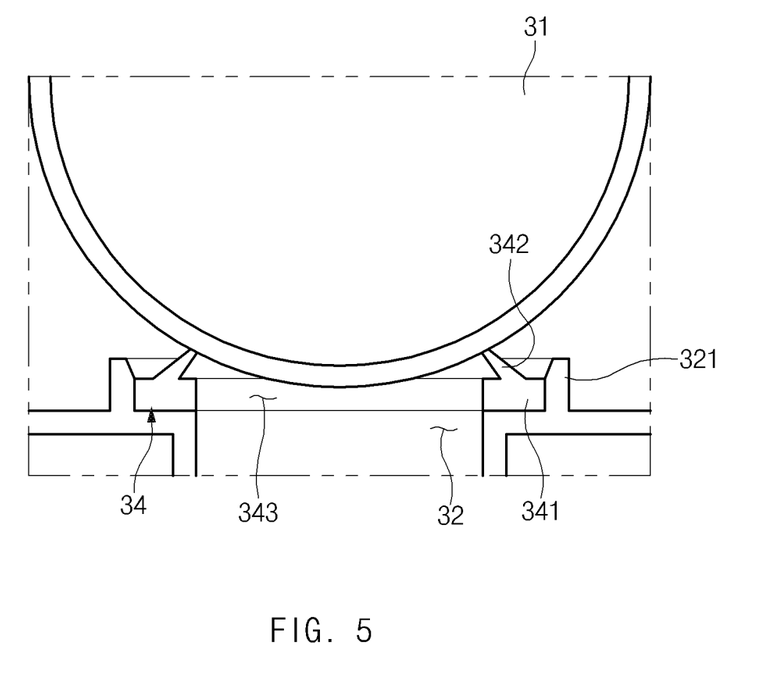
FIG. 5 is an enlarged view of area 'A' of a condensation water trap device, according to an embodiment of the present disclosure.

FIG. 5 is an enlarged view of area 'A' of the condensation water trap device 1, according to an embodiment of the present disclosure. The discharging unit 30 may further include a packing 34 having a circular shape and provided at the outlet 32. The packing 34 is a component that is formed of a material having elasticity to better maintain airtightness between the outlet 32 and the ball 31. The packing 34 has a packing base part 341 surrounding the outlet 32, and a protrusion part 342 extending to be inclined upward toward the radial center of the outlet 32 from a rim of the outlet 32 and formed in the form of a protrusion. Therefore, when the ball 31 is seated on the outlet 32, the outer circumferential surface of the ball 31 may make contact with the protrusion part 342 of the packing 34.

Since the packing base part 341 is a component coupled with the outlet 32, the packing base part may be formed in an annular shape. Accordingly, a packing hollow structure 343 is open in parallel to the outlet 32 to form a flow passage for discharging condensation water. The packing seating part 321 in the annular shape protruding in the vertical direction may be further formed at an area adjacent to the outlet 32 such that the packing 34 is seated on the inner circumferential surface of the packing seating part. Since the protrusion part 342 is a component protruding from the packing base part 341 in the annular shape, even the protrusion part 342 may be formed in the annular shape.

Since the packing 34 is formed of a material having elasticity, when the ball 31 is seated on the packing 34, the protrusion part 342 may be curved and deformed to be further inclined downward in the vertical direction by the weight of the ball 31. Therefore, since the protrusion part 342 of the packing 34 may be maintained in contact with the outer circumferential surface of the ball 31 regardless of force applied to the packing 34 by the ball 31, the airtightness between the ball 31 and the packing 34 may be further maintained. In addition, even if the shape of the packing 34 is not an annular shape corresponding to the outer circumferential surface of the ball 31, the protrusion part 342 may be deformed by elasticity, such that the contact with the outer circumferential surface of the ball 31 is totally maintained. Accordingly, when compared to a conventional case, the contact area of the packing 34 with the outer circumferential surface of the ball 31 is more increased, thereby effectively blocking the exhaust gas from being discharged.

In the conventional case, foreign matters are accumulated on a contact surface in a flat shape making contact with the ball. Accordingly, the ball makes contact with a portion of the contact surface and does not make contact with another portion of the contact surface. Accordingly, the airtightness performance between the ball and the contact surface may be lowered as the time is elapsed. When the ball fails to smoothly make contact with the contact surface, the condensation water and the exhaust gas flow out of the outlet 32 without any resistance, and the function of the trap is failed.

However, according to an embodiment of the present disclosure, since the packing 34 has elasticity, even if foreign matters are accumulated, as the packing 34 is deformed, the packing 34 and the outer circumferential surface of the ball 31 may make contact with each other without any gap, thereby preventing the airtightness performance from being deteriorated.

The packing 34 includes the protrusion part 342 having a blade-like shape in which foreign matters are difficult to accumulate, thereby structurally preventing the foreign matters from being accumulated on the packing 34 to deteriorate the airtightness performance between the packing 34 and the ball 31.

The discharging unit 30 may further include an anti-ball deviation wall 33 surrounding the ball 31. The ball 31 may float by buoyancy of the condensation water received in the storage space 35. Accordingly, as the ball 31 is seated on another position of the storage space 35 instead of the outlet 32, the ball 31 fails to close the outlet 32, so the function of the trap is failed. Accordingly, the condensation water and the exhaust gas may need to be prevented from being entirely discharged. Accordingly, there is required the anti-ball deviation wall 33, which surrounds the ball 31, is spaced apart from the outer circumferential surface of the ball 31, and extends in the vertical direction. As the anti-ball deviation wall 33 is used, the ball 31 is prevented from being away from the outlet 32 even though the ball 31 is seated after floating up. Accordingly, the ball 31 may be smoothly seated on the outlet 32.

The anti-ball deviation wall 33 may be formed to have a uniform height while surrounding the ball 31 in the direction perpendicular to the open direction of the outlet 32, such that the inner part and the outer part of the anti-ball deviation wall 33 are prevented from communicating with each other.

To remove the foreign matters, a ball trap, which has a partial side opening in a position corresponding to the anti-ball deviation wall 33, may be considered. As the exhaust gas applies force to the ball due to the structure, so the ball floats up, the exhaust gas may be discharged through the gap formed between the ball and the outlet.

According to an embodiment of the present disclosure, since there are present a mesh structure and a foreign matter removing unit 40 to be described later, the foreign matters of the condensation water have been sufficiently filtered out. Accordingly, the anti-ball deviation wall 33 may be used to fully close a remaining outer portion of the ball 31 except an upper portion of the ball 31. Accordingly, the exhaust gas is prevented from exerting an influence on the ball 31, and the exhaust gas may be prevented from being discharged through the outlet 32.

The anti-ball deviation wall 33 may be formed in the shape of a cylinder having an open center while surrounding the circular-shaped ball 31. However, the anti-ball deviation wall 33 has the substantially cylindrical shape as illustrated in the drawing, and two anti-ball deviation walls 33 are positioned at opposite ends in the shorter direction of the case 10 based on the ball 31. Accordingly, the anti-ball deviation walls 33 may be surrounded by a foreign matter removing partition 41, the discharge partition 24, and the inner sidewall of the case 10 together. In other words, the inner sidewall of the case 10, the foreign matter removing partition 41, or the discharge partition 24 may form a space while surrounding the ball 31, instead of surrounding the entire portion of the side surface of the ball 31 only using the anti-ball deviation walls 33. Referring to the drawings, when the anti-ball deviation walls 33 is viewed from the top, the anti-ball deviation walls 33 are formed while forming a pair of arcs convex in opposite directions, and both ends of the two arcs are jointed with a different partition, thereby forming a space in which the ball 31 floats up or is seated. As the anti-ball deviation wall 33 is formed in the form of surrounding the ball 31 in the direction perpendicular to the vertical direction, the ball 31 may be lifted by the buoyance of the condensation water in the vertical direction, but prevented from deviating in a direction which is different from the vertical direction and not parallel to the vertical direction.

Foreign Matter Removing Unit 40

According to an embodiment of the present disclosure, the condensation water trap device 1 may further include the foreign matter removing unit 40. The foreign matter removing unit 40 is a component to remove the foreign matter remaining in the condensation water. The foreign matter removing unit 40 is interposed between the neutralizing unit 20 and the discharging unit 30 to receive the condensation water from the neutralizing unit 20 and to discharge the condensation water to the discharging unit 30. Accordingly, the foreign matter removing unit 40 is a space defined by the discharge partition 24 of the neutralizing unit 20, the sidewall of the case 10, the bottom surface and the top surface of the case 10, and the foreign matter removing partition 41 spaced apart from the discharge partition 24 toward the discharging unit 30. The foreign matter removing partition 41 is formed to extend in the vertical direction and includes a foreign matter removing passage 42 allowing the discharging unit 30 to communicate with the foreign matter removing unit 40.

The foreign matter removing passage 42 may be disposed at a position lower than a position of the condensation water passage 23. As illustrated in FIG. 3, the height of the foreign matter removing passage 42 in the vertical direction may be higher than the height of the condensation water passage 23. Since the condensation water passage 23 and the foreign matter removing passage 42 are openings formed while extending downward in the vertical direction from the upper end of the case body 11 adjacent to the cover 12, the lower end of the foreign matter removing passage 42 may be disposed at a position lower than the position of the lower end of the condensation water passage 23 in the vertical direction. Accordingly, the water level of the condensation water discharged from the foreign matter removing unit 40 to the discharging unit 30 through the foreign matter removing passage 42 may be lower than the water level of the condensation water discharged from the neutralizing unit 2 to the foreign matter removing unit 40 through the condensation water passage 23.

The condensation water is introduced into the foreign matter removing unit 40 through the condensation water passage 23 positioned in the discharge partition 24. The condensation water, which is introduced and placed in the foreign matter removing space 43, is discharged to the discharging unit 30 through the foreign matter removing passage 42 positioned in the foreign matter removing partition 41. When the water level of the condensation water received in the foreign matter removing space 43 reaches the height of the foreign matter removing passage 42 and condensation water is additionally introduced into the foreign matter removing space 43, an excess amount of the condensation water flows out of the discharging unit 30 through the foreign matter removing passage 42.

The condensation water is introduced into the foreign matter removing space 43, so the foreign matter of the condensation water sinks in a bottom surface 44 of the foreign matter removing space. As illustrated in FIG. 3, the bottom surface 44 of the foreign matter removing space may be provided at a position lower than a height of the outlet 32. In addition, the foreign matter removing passage 42 may be disposed at a position lower than the height of the condensation water passage 23, and the straight line formed along the open direction in which the foreign matter removing passage 42 and the straight line formed in the open direction of the condensation water passage 23 are parallel to each other, and not coincident with each other.

The width of the foreign matter removing space 43 in the lengthwise direction of the condensation water trap device 1 may be narrower than the width of the first neutralizing unit inner space 221 and the width of the second neutralizing unit inner space 222. Accordingly, since the foreign matter that has settled on the bottom surface 44 of the foreign matter removing space is relatively less influenced by the flow of condensation water from the foreign matter removing space 43 to the discharging unit 30, an amount of foreign matters moving to the discharging unit 30 may be reduced.

Although the above description of the embodiment of the present disclosure has been made in that all components are integrated into one part or operate as one part, the present disclosure is not limited thereto. In other words, one or more components may be selectively combined with each other to operate within the scope of the present disclosure. In addition, the terms such as "comprise", "have", or "include" refers to the presence of a relevant component unless specified otherwise, and should be interpreted as further including another component without excluding the another component. Unless otherwise defined herein, all the terms used herein, which include technical or scientific terms, may have the same meaning that is generally understood by a person skilled in the art. It will be further understood that terms used herein should be interpreted as having a meaning that is consistent with their meaning in the context of this disclosure and the relevant art and will not be interpreted in an idealized or overly formal sense unless expressly so defined in the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

The invention claimed is:

1. A condensation water trap device comprising:
a neutralizing unit including an inlet to introduce condensation water, an inner space to receive a neutralization agent for neutralizing the introduced condensation water, and a condensation water passage to allow condensation water, which is neutralized in the inner space by the neutralization agent, to flow out;
a discharging unit including a storage space to store the condensation water directly or indirectly introduced through the condensation water passage, an outlet open in a circular shape such that the stored condensation water is discharged, a ball having a spherical shape and seated on the outlet to close the outlet, and a packing having an annular shape to surround the outlet, while extending to be inclined upward toward a radial center of the outlet from a rim of the outlet, such that an outer circumferential surface of the ball makes contact with the packing when the ball is seated on the outlet, and
a packing seating part in the annular shape protruding in the vertical direction and formed at an area adjacent to the outlet such that the packing is seated on an inner circumferential surface of the packing seating part,
wherein the packing has a packing base part surrounding the outlet, and a protrusion part extending to be inclined upward toward the radial center of the outlet from the packing base part so that the protrusion part has a blade-like shape and makes contact with the ball, and
wherein the protrusion part is formed of a material having elasticity, and curved and deformed downward in a vertical direction by a weight of the ball, when the ball is seated.

2. The condensation water trap device of claim 1, further comprising:
a discharge partition configured to separate the neutralizing unit from the discharging unit,
wherein the condensation water passage is positioned in one point, which is higher than a position of the inlet, of the discharge partition.

3. The condensation water trap device of claim 1, wherein the discharging unit further includes:
an anti-ball deviation wall configured to surround the ball, disposed to be spaced apart from an outer circumferential surface of the ball, and configured to extend upward in a vertical direction, to prevent deviation of the ball.

4. The condensation water trap device of claim 3, wherein the anti-ball deviation wall has a uniform height while surrounding the ball in a direction perpendicular to an open direction of the outlet, such that an inner part and an outer part of the anti-ball deviation wall are prevented from communicating with each other.

5. The condensation water trap device of claim 1, further comprising:
a foreign matter removing unit interposed between the neutralizing unit and the discharging unit to allow the condensation water to be introduced from the neutralizing unit and to allow the condensation water introduced from the neutralizing unit to be discharged to the discharging unit;
a discharge partition configured to separate the foreign matter removing unit from the neutralizing unit, wherein the condensation water passage is disposed in the discharge partition; and
a foreign matter removing partition configured to separate the foreign matter removing unit from the discharging unit and including a foreign matter removing passage to allow the condensation water introduced into the foreign matter removing unit to flow out of the discharging unit.

6. The condensation water trap device of claim 1, wherein a porous mesh is provided the condensation water passage to filter out foreign matters of the condensation water passing through the condensation water passage.

7. The condensation water trap device of claim 1, wherein the neutralizing unit further includes:
a neutralizing unit partition configured to partition the neutralizing unit into a first neutralizing unit and a second neutralizing unit and disposed in the inner space,
wherein the first neutralizing unit includes the inlet and allows the condensation water to flow to the second neutralizing unit through an intermediate passage formed in the neutralizing unit partition, and
wherein the second neutralizing unit includes the condensation water passage to allow the condensation water introduced through the intermediate passage to flow out to the discharging unit.

8. The condensation water trap device of claim 7, wherein a straight line formed in an open direction of the condensation water passage and a straight line formed in an open direction of the intermediate passage are parallel to each other and not coincident with each other.

9. The condensation water trap device of claim 1, wherein the neutralizing unit and the discharging unit are provided together in one case.

10. The condensation water trap device of claim 1, wherein exhaust gas is blocked from being introduced into the inner space through the inlet, due to hydraulic pressure formed based on a difference between a water level of the condensation water received in the neutralizing unit and a height of the inlet, and
  wherein the exhaust gas introduced into the inner space is blocked from being discharged to an outside through the outlet by the ball when the water level of the condensation water received in the storage space is less than the threshold water level, and blocked from being discharged to the outside through the outlet by the condensation water, when the water level of the condensation water stored in the storage space is equal to or higher than the threshold water level.

\* \* \* \* \*